United States Patent [19]

Hagan

[11] Patent Number: 4,726,481
[45] Date of Patent: Feb. 23, 1988

[54] ULTRASONICALLY WELDED CONTAINER AND PROCESS

[75] Inventor: Richard J. Hagan, San Carlos, Calif.

[73] Assignee: McKesson Corporation, Los Angeles, Calif.

[21] Appl. No.: 893,041

[22] Filed: Aug. 1, 1986

[51] Int. Cl.⁴ ............................................. B65D 39/04
[52] U.S. Cl. .................................... 215/232; 156/69; 156/73.1; 215/311; 215/355
[58] Field of Search ................... 215/232, 311, 355; 156/69, 73.1

[56] References Cited

U.S. PATENT DOCUMENTS

| | | | |
|---|---|---|---|
| 3,504,817 | 4/1970 | Heider | 215/232 |
| 3,563,822 | 2/1971 | Fesh | 156/73.1 |
| 3,728,184 | 4/1973 | Burke | 156/73.1 |
| 3,783,061 | 1/1974 | Hahn | 156/73.1 |
| 3,788,509 | 1/1974 | Keeler | 215/232 |
| 3,947,307 | 3/1976 | Buchscheidt | 156/73.1 |
| 4,088,257 | 5/1978 | Devine | 156/73.1 X |
| 4,140,058 | 2/1979 | Ballreich et al. | 156/73.1 |
| 4,356,926 | 11/1982 | Priestly | 156/73.1 X |
| 4,411,783 | 10/1983 | Dickens et al. | 55/204 X |

Primary Examiner—Donald F. Norton
Attorney, Agent, or Firm—Flehr, Hohbach, Test, Albritton & Herbert

[57] ABSTRACT

A package (10) includes a polyethylene terephthalate (PET) container (12) having a necked opening (14). A PET insert (18) is fixedly attached to an inside surface (30) of the necked opening (14) by a plurality of tack welds (34). The insert (18) makes a substantially line contact (32) with the inside surface (30) of the necked opening (14). The substantially line contact (32) extends continuously around the inside surface (30) of the necked opening (14) to form a fluid tight seal between the inside surface (30) of the necked opening (14) and the insert (18). To make the package (10), the insert (18) is driven into the necked opening (14). The tack welds (34) are formed between the necked opening (14) and the insert (18) by application of ultrasonic energy at the necked opening (14) below the line contact (32). The tack welds (34) fixedly attach the insert (18) to the necked opening (14).

24 Claims, 5 Drawing Figures

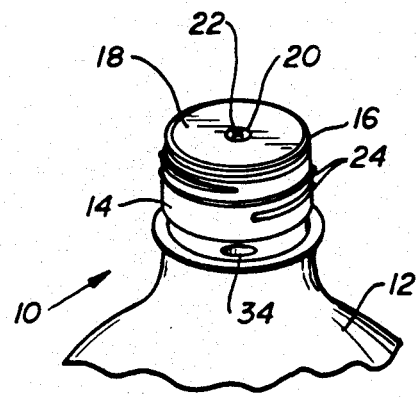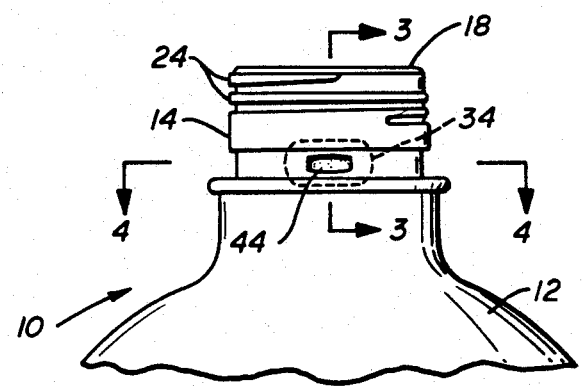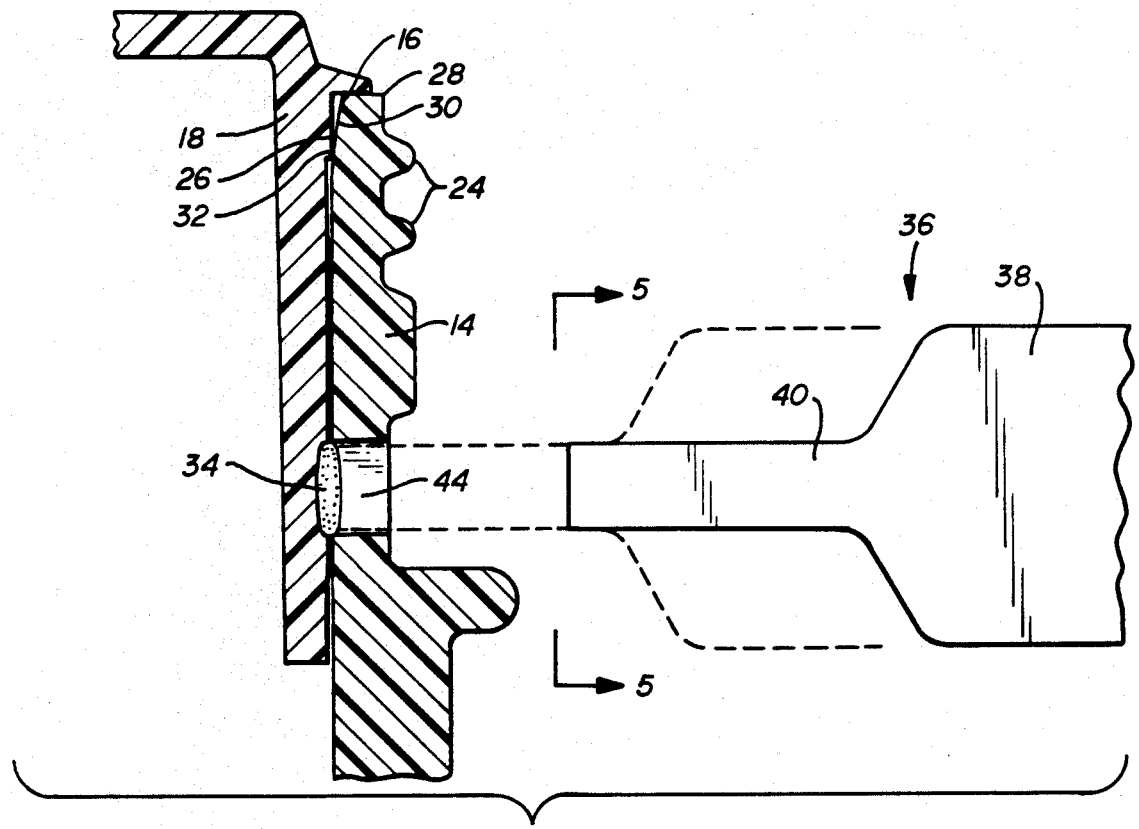

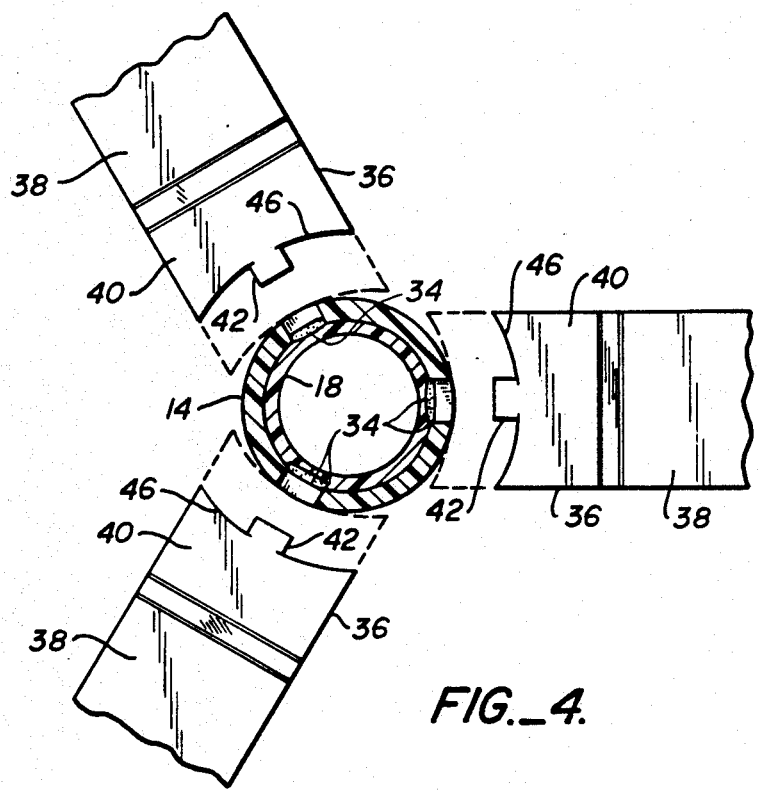
FIG._4.
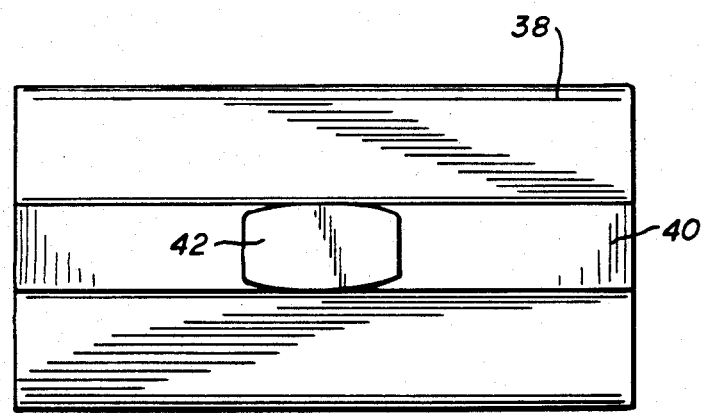
FIG._5.

ULTRASONICALLY WELDED CONTAINER AND PROCESS

CROSS REFERENCE TO RELATED APPLICATIONS

This application and the following copending applications by Richard J. Hagan are directed to related inventions: Ser. No. 06/685,912, filed Dec. 27, 1984 and entitled "Method and Apparatus for Storing and Dispensing Fluids Containered Under Gas Pressure"; Ser. No. 06/635,450, filed July 31, 1984 and entitled "Syphon Assembly and Package Incorporating the Assembly", now U.S. Pat. No. 4,671,436; Ser. No. 06/687,296, filed Dec. 28, 1984 and entitled "Integral Syphon Package Head", now U.S. Pat. No. 4,660,748; Richard J. Hagan and Dennis A. Lempert, Ser. No. 06/704,763, filed Feb. 20, 1985 and entitled, "Seltzer Filling Apparatus and Process"; and Richard J. Hagan and John J. McIntyre, Ser. No. 06/844,619, filed Mar. 27, 1986 and entitled "Seltzer Package, Valve, Poppet and Spring", now abandoned in favor of continuation-in-part application Ser. No 07/008,628, filed Jan. 29, 1987.

BACKGROUND OF THE INVENTION

1. Field of the Invention

This invention relates to an improved hermetically sealed container capable of withstanding elevated pressures and to a process for making the container and process which is especially adapted for use as an all plastic seltzer syphon package and for providing such an all plastic seltzer syphon package. Most especially, the invention relates to such a package incorporating an improved hermetic seal and to a process for making the hermetic seal.

2. Description of the Prior Art

The extensive prior art pertaining to syphon seltzer water packages has been set forth in the first related application listed above. Briefly, until the inventions of the first three related applications, seltzer water was conventionally packaged in thick glass bottles with permanently attached heads. The bottles were filled through the heads, shipped to the consumer, used by the consumer and returned to the bottler for cleaning and refilling, all without removing the head from the bottle. In order to dispense the seltzer water through a syphon, pressures of at least about 90 pounds per square inch are required, substantially higher than for conventional carbonated beverages, and may reach 125 p.s.i. Glass containers filled to such pressures are dangerous. This fact and the economics of the distribution process resulted in a decline in the syphon seltzer water business to the point that syphon seltzer water is available in only a few areas of the United States at the present time.

The inventions of the above related applications have, for the first time, made it practical to package syphon seltzer water in plastic bottles with the dispensing head separated from the bottles. The packages disclosed in the first three and the last related applications include a normally closed valve in the neck of the containers. The bottles may be shipped in conventional distribution channels with twist-off caps, which the consumer removes and replaces with a reusable dispensing head which is used to open the valve in order to dispense the seltzer water from the package. Unlike conventional carbonated beverage containers, these packages and the higher pressures employed allow the seltzer water to remain pressurized until the container is emptied, so that the product does not go flat when the container is partly empty.

As taught in these applicatios, it is desirable to provide the normally closed valve in an insert which is ultrasonically bonded to the neck of the package container. A variety of ultlrasonic bonding processes are also known in the art. The following issued U.S. patents relate generally to the ultrasonic bonding of plastics: U.S. Pat. No. 3,728,184, issued Apr. 17, 1973 to Burke et al.; U.S. Pat. No. 3,783,061, issued Jan. 1, 1974 to Hahn; U.S. Pat. No. 3,947,307, issued Mar. 30, 1976 to Buchscheidt; U.S. Pat. No. 4,140,058, issued Feb. 20, 1979 to Ballreich et al.; U.S. Pat. No. 4,356,926, issued Nov. 2, 1982 to Priestly et al. U.S. Pat. Nos. 3,563,822, issued Feb. 16, 1971 to Fesh and 4,088,257, issued May 9, 1978 to Devine disclose tack or spot ultlrasonic welding of plastics. U.S. Pat. No. 4,411,783, issued Oct. 25, 1983 to Dickens et al. teaches that ultrasonic fluid tight seals should include double or triple shear seals in order to withstand elevated pressures.

The following additional references relate specifically to the ultrasonic bonding of polyethylene terephthalate (PET): Japanese Patent Publication 54062260, dated May 19, 1979; West German Published Application 1779457, dated Sept. 23, 1971; Japanese Patent Publication 57088427, dated June 2, 1982. While it is apparent that the art pertaining to ultrasonic welding and beverage containers is well developed, problems have been encountered in applying prior art ultrasonic welding techniques to the formation of all PE hermetically sealed beverage containers capable of withstanding elevated pressures of up to at least about 90 p.s.i. required for seltzer syphon packages.

SUMMARY OF THE INVENTION

Accordingly, it is an object of this invention to provide an improved hermetically sealed plastic package capable of withstanding elevated pressures.

It is another object of the invention to provide such an improved package in which the hermetic seal is formed in part by ultrasonic welding.

It is a further object of the invention to provide such an improved package incorporating a PET to PET seal.

It is yet another object of the invention to provide a novel process for forming a PET to PET hermetic seal which will withstand elevated pressures, such as encountered in seltzer syphon packages.

It is still another object of the invention to provide a novel simplified process for forming a hermetic seal between thermoplastic resin parts which will allow such seals to be made under high throughput manufacturing conditions.

The attainment of these and related objects may be achieved through use of the novel package and process herein disclosed. A package in accordance with this invention includes a thermoplastic, ultrasonically weldable resin, such as a PET, container having a necked opening. A thermoplastic, ultrasonically weldable resin insert is fixedly attached to an inside surface of the necked opening by a plurality of tack welds. The insert makes a substantially line contact with the inside surface of the necked opening. The substantially line contact extends continuously around the inside surface of the necked opening to form a fluid tight seal between the inside surface of the necked opening and the insert.

In the process for making the package in accordance with this invention, a thermoplastic, ultrasonically weldable resin container having a necked opening and a thermoplastic, ultrasonically weldable resin insert having a portion of greater cross sectional dimension than a remainder of the insert is provided. The portion of greater cross sectional dimension is sized to form an interference fit in the neck opening. The insert is driven into the necked opening. A plurality of tack welds are formed between the necked opening and the insert by application of ultrasonic energy at the necked opening below the portion of greater cross sectional dimension of the insert. The tack welds fixedly attach the insert to the necked opening.

While essentially any thermoplastic, ultrasonically weldable resin may be employed in the package and process, they are especially suited for use with crystallizable thermoplastic, ultrasonically weldable resins. Such crystallizable resins, particularly PET, may undergo undesirably high levels of crystallization using conventional ultrasonic welding processes to make hermetic seals. Because the present invention prevents such undesirable cystallization from occurring, even in the case of PET, it is particularly advantageous for such resins. However, the process is simple and allows a very high throughput of containers in the formation of their hermetic seals. For these reasons, the invention is also useful for amorphous thermoplastic, ultrasonically weldable resins, even though such resins are not subject to undesirable crystallization with conventional ultrasonic bonded hermetic seals, such as an ultrasonically formed band seal between a container neck and an insert in the neck.

The combination of a line contact hermetic seal and the tack welds gives a package that will safely withstand pressures on the order of at least 90 p.s.i., which are conventional for seltzer syphon packages. The process producing such a seal allows such packages to be made under high volume manufacturing conditions.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a portion of a package in accordance with the invention.

FIG. 2 is a side view of the package portion shown in FIG. 1.

FIG. 3 is a cross section view taken along the line 3—3 in FIG. 2.

FIG. 4 is a top sectional view taken along the line 4—4 in FIG. 2.

FIG. 5 is a front view of apparatus used to practice the process of the invention.

DETAILED DESCRIPTION OF THE INVENTION

Turning now to the drawings, more particularly to FIGS. 1–3, there is shown a package 10 in accordance with the invention. The package 10 includes a biaxially oriented PET bottle 12 having a neck 14 with an opening 16. A generally cylindrical insert 18 is attached to the necked opening 16 to form a hermetic seal. The insert 18 has a centrally disposed opening 20 sealed by a normally closed poppet valve 22. Neck 14 of the bottle 12 has a set 24 of threads on its outside surface for attaching a conventional aluminum closure cap (not shown) over the insert 18, as well as for attaching a syphon head (not shown) over the insert 18 after the aluminum closure cap has been removed. Further details on the nature of the package 10, including a complete description of the bottle 10, the insert 18 and the poppet valve 22 are provided in the last above-referenced related application, the disclosure of which is incorporated by reference herein.

To attach the insert 18 in the necked opening 16, the insert 18 is driven into the opening 16, as is best shown in FIG. 3. The insert 18 is dimensioned for an interference fit in the opening 16. In practice, the insert 18 has a portion 26 of increased diameter, which is about 0.025 inch greater than the inside diameter of the opening 16 to provide the interference fit. The interference fit is sufficient to hold the insert 18 in place in the opening 16. When the insert 18 is driven into the opening 16, the slightly larger diameter of the portion 26 than the inside diameter of the opening 16 forces the neck 14 to crown out slightly near its top 28, inclining the inside surface 30 of the neck 14. As a result of this incline, the portion 26 of increased diameter of the insert 18 makes a substantially line contact 32 extending around the inside surface 30 of the neck 14. The line contact 32 is about 0.075 inch below top 28 of the neck 14. This line contact 32 between the portion 26 and the surface 30 is with sufficient force that a hermetic seal is established that will withstand up to about 100 p.s.i. internal pressure in the bottle 12 prior to forming the ultrasonic welds before the insert 18 is blown from the opening 16.

For fixed attachment of the insert 18 in the neck 14, three ultrasonically formed tack welds 34 are established between the neck 14 and the insert 18 around the neck 14. The tack welds are formed below the threads 24 in order to avoid distorting the threads.

As shown in FIGS. 3 and 4, the tack welds 34 are formed at 120° spacings around the neck 14 and insert 18 by moving three ultrasonic transducers or horns 36 for application of the ultrasonic energy against the neck of the bottle. The ultrasonic transducers 36 have a body 38 narrowing in thickness to a reed 40 (see also FIG. 5). In practice, the body 18 has a thickness of between 6 and 8 times the thickness of the reed 40. The reed 40 has an oval cross section projecting tip 42, which forms a recess 44 in the neck 14 of the bottle 12 during formation of the tack weld 34. The reed 40 is curved at 46 to fit against the neck 14. An aluminum transducer or a titanium transducer having a gain of 6 to 1 has been found to be suitable for practicing the process. As shown in FIG. 3, the tack weld is formed by melting a portion of both the insert 18 and the neck 14 to form a molecular bond between them. The tip 42 of the reed 40 need not penetrate completely through the neck 14 for this to occur.

A weld time of from about one half to about one second is suitable, with a time of about 0.55 seconds being especially preferred. Shorter or longer weld times may be necessary for packages having a different configuration than that shown or for other thermoplastic resins.

In practice, an ultrasonic frequency of between about 30 to about 50 kilohertz and a somewhat lower amplitude than employed with conventional 20 kilohertz ultrasonic frequencies usually employed for ultrasonic welding of plastics is used. At these higher frequencies and lower amplitudes, sufficient heat for melting the PET to produce the tack weld is obtained without significant crystallization of the PET. By comparison, when sufficient ultrasonic energy is applied to form a continuous band ultrasonic weld between the insert 18 and the neck 14, a hermetic seal cannot be obtained without producing a high level of crystallization of the PET at the insert 18 and neck 14, which weakens the PET sufficiently so that failure occurs. With high speed automated equipment for handling the bottles 12 and inserts 18, a throughput of 60 bottles per minute for each ultrasonic welding station can be achieved.

The package of this invention can be fabricated with a wide variety of other thermoplastic resins that can be ultlrasonically welded in addition to PET. While the package and process is especially adapted for crystallizable thermoplastic resins, since it will avoid excess crystallization of such resins, the simplicity and speed of the process make it desirable for use with amorphous thermoplastic resins as well. Suitable specific examples of amorphous and crystallizable thermoplastic resins, in addition to PET, include PET copolymers, such as PET-glycol resins, other polyester resins, polycarbonates, nylons, acetyl-butyl-styrene (ABS) plastics, polypropylene, polystyrene, butadiene, polyphenylene oxide and sulfide, polyamide-imide copolymers, acrylic resins, polyvinyl chloride and the like.

It should now be readily apparent to those skilled in the art that a novel package and process for producing the package capable of achieving the stated objects of the invention has been provided. The package includes a simple and reliable hermetic seal incorporating a line contact in combination with a plurality of tack welds that is capable of withstanding the pressures of between about 90 p.s.i. and 125 p.s.i. encountered in seltzer syphon packages. In combination with the tack welds, the line contact seal is capable of withstanding pressures in excess of 500 p.s.i. The process allows packages incorporating the hermetic seal to be easily fabricated under high volume manufacturing conditions.

It should further be apparent to those skilled in the art that various changes in form and detail of the invention as shown and described may be made. It is intended that such changes be included within the spirit and scope of the claims appended hereto.

What is claimed is:

1. A package comprising a thermoplastic, ultrasonically weldable resin container having a necked opening and a thermoplastic, ultrasonically weldable resin insert fixedly attached to an inside surface of said necked opening by a plurality of tack welds, said insert making a substantially line contact with the inside surface of said necked opening, said substantially line contact extending continuously around the inside surface of said necked opening to form a fluid tight seal between the inside surface of said necked opening and said insert, said thermoplastic, ultrasonically weldable resin container and insert being a crystallizable when subjected to ultrasonic bonding energy resin container and insert.

2. The package of claim 1 in which said resin insert is fixedly attached to the inside surface of said necked opening by at least three tack welds.

3. The package of claim 1 in which the crystallizable when subjected to ultrasonic bonding energy resin is polyethylene terephthalate.

4. A package comprising a thermoplastic, ultrasonically weldable resin container having a necked opening and a thermoplastic, ultrasonically weldable resin insert fixedly attached to an inside surface of said necked opening by a plurality of tack welds, said insert making a substantially line contact with the inside surface of said necked opening, said substantially line contact extending continuously around the inside surface of said necked opening to form a fluid tight seal between the inside surface of said necked opening and said insert, said necked opening having an external surface having a set of threads and said plurality of tack welds being below said set of threads.

5. A package comprising a thermoplastic, ultrasonically weldable resin container having a necked opening and a thermoplastic, ultrasonically weldable resin insert fixedly attached to an inside surface of said necked opening by a plurality of tack welds, said insert making a substantially line contact with the inside surface of said necked opening, said substantially line contact extending continuously around the inside surface of said necked opening to form a fluid tight seal between the inside surface of said necked opening and said insert, said insert having a portion of greater cross sectional dimension than a remainder of said insert near a top of said insert and said necked opening, said portion of greater cross sectional dimension engaging the inside surface of said necked opening near the top of said necked opening in an interference fit, said necked opening inclining outward at the engagement of said portion of greater cross sectional dimension and the inside surface of said necked opening.

6. A package comprising a thermoplastic, ultrasonically weldable resin container having a necked opening and a thermoplastic, ultrasonically weldable resin insert fixedly attached to an inside surface of said necked opening by a plurality of tack welds, said insert making a substantially line contact with the inside surface of said necked opening, said substantially line contact extending continuously around the inside surface of said necked opening to form a fluid tight seal between the inside surface of said necked opening and said insert, said insert having a fluid flow path through said necked opening and a normally closed valve in said fluid flow path.

7. A process for making a package, which comprises providing a thermoplastic, ultrasonically weldable resin container having a necked opening and a thermoplastic, ultlrasonically weldable resin insert having a portion of greater cross sectional dimension than a remainder of the insert, the portion of greater cross sectional dimension being sized to form an interference fit in the necked opening, driving the insert into the necked opening, and forming a plurality of tack welds between the necked opening and the insert, fixedly to attach the insert to the necked opening, by application of ultrasonic energy at the necked opening below the portion of greater cross sectional dimension of the insert, the thermoplastic, ultrasonically weldable resin container and insert being a crystallizable when subjected to ultrasonic bonding energy resin container and insert.

8. The process of claim 7 in which the ultrasonic energy is applied by contacting the necked opening of the container simultaneously with a plurality of ultrasonic transducers having projecting tips.

9. The process of claim 7 in which the ultrasonic energy has a frequency of between about 30 kilohertz and about 50 kilohertz.

10. The process of claim 7 in which the crystallizable when subjected to ultlrasonic bonding energy resin is polyethylene terephthalate.

11. The process of claim 7 in which at least three tack welds are formed.

12. A process for making a package, which comprises providing a thermoplastic, ultrasonically weldable resin container having a necked opening and a thermoplastic, ultrasonically weldable resin insert having a portion of greater cross sectional dimension than a remainder of the insert, the portion of greater cross sectional dimension being sized to form an interference fit in the necked opening, driving the insert into the necked opening, and forming a plurality of tack welds between the necked opening and the insert, fixedly to attach the insert to the necked opening, by application of ultrasonic energy at the necked opening below the portion of greater cross sectional dimension of the insert, the necked opening having an outside surface having a set of threads and the tack welds being formed below the set of threads.

13. A process for making a package, which comprises providing a thermoplastic, ultrasonically weldable resin container having a necked opening and a thermoplastic, ultrasonically weldable resin insert, the insert being sized to form an interference fit in the necked opening, driving the insert into the necked opening to establish a substantially line contact extending around an inside surface of the necked opening to form a hermetic seal between the inside surface of the necked opening and the insert, and forming a plurality of tack welds between the necked opening and the insert, fixedly to attach the insert to the necked opening, by application of ultrasonic energy at the necked opening below the substantially line contact, the thermoplastic, ultrasonically weldable resin container and insert being a crystallizable when subjected to ultrasonic bonding energy resin container and insert.

14. The process of claim 13 in which the ultrasonic energy is applied by contacting the necked opening of the container simultaneously with a plurality of ultrasonic transducers having projecting tips.

15. The process of claim 13 in which the ultrasonic energy has a frequency of between about 30 kilohertz and about 50 kilohertz.

16. The process of claim 13 in which the crystallizable when subjected to ultrasonic bonding energy resin is polyethylene terephthalate.

17. The process of claim 13 in which at least three tack welds are formed.

18. A process for making a package, which comprises providing a thermoplastic, ultrasonically weldable resin container having a necked opening and a thermoplastic, ultrasonically weldable resin insert, the insert being sized to form an interference fit in the necked opening, driving the insert into the necked opening to establish a substantially line contact extending around an inside surface of the necked opening to form a hermetic seal between the inside surface of the necked opening and the insert, and forming a plurality of tack welds between the necked opening and the insert, fixedly to attach the insert to the necked opening, by application of ultlrasonic energy at the necked opening below the substantially line contact, the necked opening having an outside surface having a set of threads and the tack welds being formed below the set of threads.

19. A package comprising a thermoplastic resin container having a necked opening and a thermoplastic resin insert fixedly attached to an inside surface of said necked opening by at least one attachment between said insert and the inside surface of said necked opening, said insert making a substantially line contact with the inside surface of said necked opening, said substantially line contact extending continuously around the inside surface of said necked opening to form a fluid tight seal between the inside surface of said necked opening and said insert, said insert having a portion of greater cross sectional dimension than a remainder of said insert near a top of said insert and said necked opening, said portion of greater cross sectional dimension engaging the inside surface of said necked opening near the top of said necked opening in an interference fit, said necked opening inclining outward at the engagement of said portion of greater cross sectional dimension and the inside surface of said necked opening.

20. The package of claim 19 in which said at least one attachment comprises a discontinuous plurality of attachments.

21. A package comprising a thermoplastic resin container having a necked opening and a thermoplastic resin insert fixedly attached to an inside surface of said necked opening by at least one attachment between said insert and the inside surface of the necked opening, said insert making a substantially line contact with the inside surface of said necked opening, said substantially line contact extending continuously around the inside surface of said necked opening to form a fluid tight seal between the inside surface of said necked opening and said insert and being spaced from said at least one attachment, said insert having a fluid flow path through said necked opening and a normally closed valve in said fluid flow path.

22. The package of claim 21 in which said at least one attachment comprises a discontinous plurality of attachments.

23. A process for making a package, which comprises providing a thermoplastic resin container having a necked opening and a thermoplastic resin insert with a fluid flow path through the insert and a normally closed valve in the fluid flow path, the insert being sized to form an interference fit in the necked opening with the fluid flow path through the necked opening, driving the insert into the necked opening to establish a substantially line contact extending around an inside surface of the necked opening to form a hermetic seal between the inside surface of the necked opening and the insert, and forming at least one attachment between the necked opening and the insert and spaced from the substantially line contact, fixedly to attach the insert to the necked opening.

24. The process of claim 23 in which a discontinuous plurality of attachments are formed between the necked opening and the insert.

* * * * *